United States Patent
Nishiwaki

(10) Patent No.: US 9,101,961 B2
(45) Date of Patent: Aug. 11, 2015

(54) WORD RECOGNITION APPARATUS, WORD RECOGNITION METHOD, NON-TRANSITORY COMPUTER READABLE MEDIUM STORING WORD RECOGNITION PROGRAM, AND DELIVERY ITEM SORTING APPARATUS

(75) Inventor: Daisuke Nishiwaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 15 days.

(21) Appl. No.: 13/389,475

(22) PCT Filed: Jun. 14, 2010

(86) PCT No.: PCT/JP2010/003929
§ 371 (c)(1),
(2), (4) Date: Feb. 8, 2012

(87) PCT Pub. No.: WO2011/036830
PCT Pub. Date: Mar. 31, 2011

(65) Prior Publication Data
US 2012/0140979 A1    Jun. 7, 2012

(30) Foreign Application Priority Data

Sep. 24, 2009 (JP) ................................. 2009-218465
Mar. 18, 2010 (JP) ................................. 2010-062566

(51) Int. Cl.
*G06K 9/00* (2006.01)
*B07C 3/14* (2006.01)
*G06K 9/72* (2006.01)

(52) U.S. Cl.
CPC .. *B07C 3/14* (2013.01); *G06K 9/723* (2013.01)

(58) Field of Classification Search
None
See application file for complete search history.

(56) References Cited

U.S. PATENT DOCUMENTS

| 4,903,206 | A | * | 2/1990 | Itoh et al. | 715/234 |
| 5,667,078 | A | * | 9/1997 | Walach | 209/584 |
| 5,689,583 | A | * | 11/1997 | Niwa et al. | 382/181 |
| 5,774,588 | A | * | 6/1998 | Li | 382/230 |
| 5,778,405 | A | * | 7/1998 | Ogawa | 715/259 |

(Continued)

FOREIGN PATENT DOCUMENTS

| JP | 56-99582 A | 8/1981 |
| JP | 3-154985 A | 7/1991 |

(Continued)

OTHER PUBLICATIONS

International Search Report for PCT/JP2010/003929 mailed Jul. 6, 2010.

*Primary Examiner* — Jon Chang
*Assistant Examiner* — Oneal R Mistry
(74) *Attorney, Agent, or Firm* — Sughrue Mion, PLLC

(57) ABSTRACT

To improve the recognition accuracy even when a plurality of words including a matched portion are selected as candidates for recognition. A word recognition apparatus according to the present invention includes input means for inputting a word image representing a plurality of characters; word candidate selection means for recognizing the word image input by the input means and selecting a first word candidate and a second word candidate based on a plurality of words registered in a word dictionary; and verification means for comparing the first word candidate and the second word candidate character by character and verifying a likelihood of the first word candidate based on an evaluation value obtained when the word image is recognized by characters determined as unmatched.

20 Claims, 12 Drawing Sheets

(56) References Cited

U.S. PATENT DOCUMENTS

| | | | |
|---|---|---|---|
| 6,005,973 A * | 12/1999 | Seybold et al. | 382/187 |
| 6,131,102 A * | 10/2000 | Potter | 715/257 |
| 6,978,044 B2 * | 12/2005 | Akagi | 382/187 |
| 7,584,093 B2 * | 9/2009 | Potter et al. | 704/9 |
| 8,031,942 B2 * | 10/2011 | Sakagami | 382/181 |
| 8,208,730 B2 * | 6/2012 | Tanaka | 382/187 |
| 2003/0059115 A1 * | 3/2003 | Nakagawa | 382/197 |
| 2008/0189605 A1 * | 8/2008 | Kay et al. | 715/257 |
| 2009/0089666 A1 * | 4/2009 | White et al. | 715/257 |
| 2009/0092323 A1 * | 4/2009 | Qiu et al. | 382/229 |
| 2010/0215277 A1 * | 8/2010 | Huntington et al. | 382/218 |

FOREIGN PATENT DOCUMENTS

| | | |
|---|---|---|
| JP | 2000353215 A | 12/2000 |
| JP | 2001291060 A | 10/2001 |
| JP | 2005165383 A | 6/2005 |
| JP | 3804540 B | 8/2006 |
| JP | 2008097452 A | 4/2008 |
| JP | 2008210132 A | 9/2008 |

* cited by examiner (NAME OF CITY) : (NAMES OF PLACES IN CITY)

MIDLETON ;; BALLYADAM
MIDLETON ;; BALLYATRASNA
MIDLETON ;; BALLYCRANA
MIDLETON ;; BALLYEDMOND
MIDLETON ;; BALLYMACSLINEY
MIDLETON ;; BALLYNABOINTRA
MIDLETON ;; BALLYNACLASHA
MIDLETON ;; BALLYRICHARD

MATCHED    UNMATCHED
PORTION    PORTION

Fig. 8

$R1 = \{ r11, r12, \cdots, r1i, \cdots, r1m \}$ $R2 = \{ r21, r22, \cdots, r2j, \cdots, r2n \}$

$S1 = \{ s11, s12, \cdots, s1i, \cdots, s1m \}$ $S2 = \{ s21, s22, \cdots, s2j, \cdots, s2n \}$

WORD RECOGNITION APPARATUS, WORD RECOGNITION METHOD, NON-TRANSITORY COMPUTER READABLE MEDIUM STORING WORD RECOGNITION PROGRAM, AND DELIVERY ITEM SORTING APPARATUS

TECHNICAL FIELD

The present invention relates to a word recognition apparatus, a word recognition method, a non-transitory computer readable medium storing a word recognition program, and a delivery item sorting apparatus. In particular, the present invention relates to a word recognition apparatus, a word recognition method, and a non-transitory computer readable medium storing a word recognition program for recognizing words including a plurality of predetermined character strings from information printed on paper, and to a delivery item sorting apparatus.

BACKGROUND ART

Word recognition is a technique that recognizes words including a plurality of predetermined character strings from information printed on paper. Address recognition is one of application fields of word recognition. Addresses are hierarchized in order of level such as a state, a city, and a place in the city. Thus, the words of each level are recognized by sequentially reading them in the hierarchical order, to thereby recognize a destination address. Assume that, for example, a specific state name contained in information at a first level can be recognized from a plurality of state names. In this case, to specify the name of a certain city, which is information at a subsequent level, it is only necessary to perform recognition among a plurality of city names belonging to the recognized state name. Such a method that limits the words to be recognized in advance is called "word driven recognition".

Patent Literature 1 discloses a technique relating to a word recognition apparatus that collates a plurality of words with a character string input by a character input device, and recognizes words corresponding to the input character string. The word recognition apparatus disclosed in Patent Literature 1 collates the input character string with the words, and calculates the degree of difference which is a distance between the input character string and each collated word. Further, when words having a similar degree of difference are included in the plurality of words, the word recognition apparatus disclosed in Patent Literature 1 calculates the degree of difference (degree of mutual difference) between the words. Then, the word recognition apparatus disclosed in Patent Literature 1 distinguishes similar words by weighting the degree of mutual difference according to the length of the matched character string. Specifically, assuming that a word length including a larger number of characters among the words to be compared is P' and the number of characters of a maximum common character string is d12, the degree of mutual difference is weighted using a value calculated by $(P'-d12)/P'$.

Patent Literature 2 discloses a technique relating to an apparatus that automatically sorts indefinite thin mail pieces or books according to delivery destinations. The apparatus disclosed in Patent Literature 2 is a mail sequencing system that separates objects to be processed one by one, throws the separated objects to be processed, reads information from barcodes or addresses, sorts the objects according to delivery destinations for each of a plurality of sorting bins, and stacks the objects to be processed on a stacking tray provided in each of the sorting bins, thereby performing sorting processing.

CITATION LIST

Patent Literature

[Patent Literature 1] Japanese Unexamined Patent Application Publication No. 56-099582
[Patent Literature 2] Japanese Patent No. 3804540

However, even when Patent Literature 1 is applied, there is a problem that the recognition accuracy is still insufficient. This is because the degree of difference described above includes a distance between a matched character string between similar words and an input character string. Each distance between the matched character string and the input character string is the same. Thus, in Patent Literature 1, if a most part of character strings is marched between similar words, there is little difference in the degree of mutual difference between the similar words. This makes it difficult to distinguish similar words. Therefore, the recognition accuracy is insufficient in Patent Literature 1.

SUMMARY OF INVENTION

Technical Problem

The present invention has been made to solve the above-mentioned problem, and has an object to provide a word recognition apparatus, a word recognition method, a non-transitory computer readable medium storing a word recognition program, and a delivery item sorting apparatus that are capable of improving the recognition accuracy even when a plurality of words including a matched portion are selected as candidates for recognition.

Solution to Problem

A word recognition apparatus according to a first exemplary aspect of the present invention includes: input means for inputting a word image representing a plurality of characters; word candidate selection means for recognizing the word image input by the input means and selecting a first word candidate and a second word candidate based on a plurality of words registered in a word dictionary; and verification means for comparing the first word candidate and the second word candidate character by character and verifying a likelihood of the first word candidate based on an evaluation value obtained when the word image is recognized by characters determined as unmatched.

A word recognition method according to a second exemplary aspect of the present invention includes: an input step of inputting a word image representing a plurality of characters; a word candidate selection step of recognizing the word image input by the input step and selecting a first word candidate and a second word candidate based on a plurality of words registered in a word dictionary; and a verification step of comparing the first word candidate and the second word candidate character by character and verifying a likelihood of the first word candidate based on an evaluation value obtained when the word image is recognized by characters determined as unmatched.

A non-transitory computer readable medium storing a word recognition program according to a third exemplary aspect of the present invention causes a computer to execute: input processing for inputting a word image representing a plurality of characters; word candidate selection processing for recognizing the word image input by the input processing and selecting a first word candidate and a second word candidate based on a plurality of words registered in a word dictionary; and verification processing for comparing the first word candidate and the second word candidate character by character and verifying a likelihood of the first word candidate based on an evaluation value obtained when the word image is recognized by characters determined as unmatched.

A delivery item sorting apparatus according to a fourth exemplary aspect of the present invention includes: a supply unit that supplies delivery items one by one; a transport unit that transports the delivery items; a scanner unit that captures an image of each of the delivery items and converts the image into image data; an address recognition unit that recognizes a destination address of the delivery item from the image data; a sorting unit that sorts the delivery items into sorting boxes assigned to each destination address recognized by the address recognition unit; and a control unit that controls operations of the supply unit, the transport unit, the scanner unit, the address recognition unit, and the sorting unit, in which the address recognition unit includes a word recognition apparatus according to the first exemplary aspect of the present invention.

Advantageous Effects of Invention

According to the present invention, it is possible to provide a word recognition apparatus, a word recognition method, a non-transitory computer readable medium storing a word recognition program, and a delivery item sorting apparatus that are capable of improving the recognition accuracy even when a plurality of words including a matched portion are selected as candidates for recognition.

BRIEF DESCRIPTION OF DRAWINGS

FIG. 8 is a diagram illustrating a notation of recognition results according to the second exemplary embodiment of the present invention;

FIG. 9 is a diagram showing an example of the notation of the recognition results according to the second exemplary embodiment of the present invention;

FIG. 10 is a diagram illustrating a notation of recognition evaluation values according to the second exemplary embodiment of the present invention;

FIG. 14 is a diagram showing a detection example of the matched portion of the recognition results according to the second exemplary embodiment of the present invention.

DESCRIPTION OF EMBODIMENTS

Figure 1:
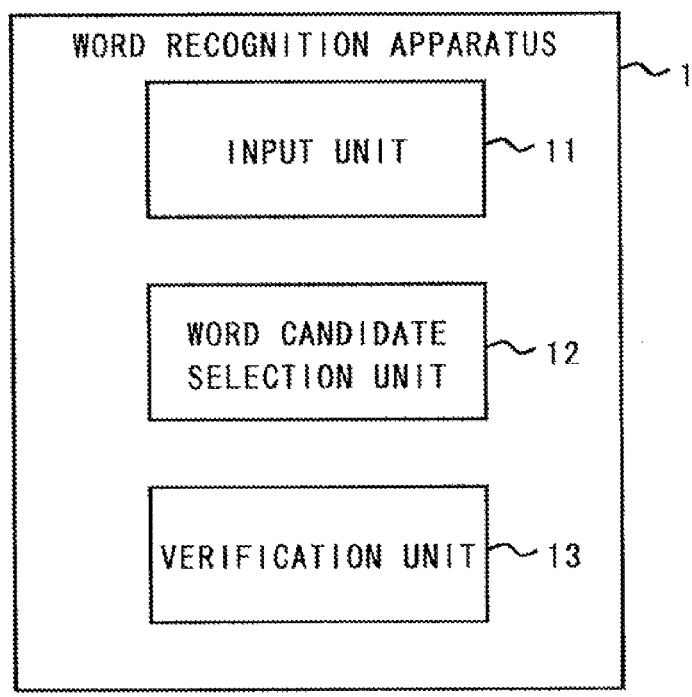
FIG. 1 is a block diagram showing a configuration of a word recognition apparatus according to a first exemplary embodiment of the present invention.

Specific embodiments to which the present invention is applied will be described hereinafter in detail with reference to the drawings. The same components are denoted by the same reference numerals throughout the drawings, and a repeated description thereof is omitted as appropriate to clarify the explanation.

<First Exemplary Embodiment>

FIG. 1 is a block diagram showing a configuration of a word recognition apparatus 1 according to a first exemplary embodiment of the present invention. The word recognition apparatus 1 includes an input unit 11, a word candidate selection unit 12, and a verification unit 13.

The input unit 11 inputs a word image representing a plurality of characters. The word image is, for example, image data representing a plurality of characters indicating an address or the like. A word image obtained by converting an address or the like printed on paper into an image by using a scanner or the like may also be used. Alternatively, any image data may be used.

The word candidate selection unit 12 recognizes the word image, which is input by the input unit 11, based on a plurality of words registered in a word dictionary, and selects a first word candidate and a second word candidate. The term "word" herein described refers to character string data including a plurality of characters. The word dictionary is a dictionary database having registered therein a plurality of words. For example, the word dictionary may be stored in a storage device (not shown) provided in the word recognition apparatus 1. Alternatively, the word dictionary may be stored in a storage device provided outside the word recognition apparatus 1, and the word recognition apparatus 1 may refer to data in the external storage device, as needed. The plurality of words registered in the word dictionary are different words, but the character strings thereof include common characters.

The word candidate selection unit 12 determines which of the plurality of words registered in the word dictionary is similar to the input word image. Then, the word candidate selection unit 12 selects words showing relatively good determination results, as word candidates. The word candidate selection unit 12 selects at least the first word candidate which is a first determination result, and the second word candidate which is a second determination result. For instance, the word candidate selection unit 12 may recognize the word image in the following manner. First, the word candidate selection unit 12 selects the plurality of words, which are registered in the word dictionary, one by one. Then, the word candidate selection unit 12 collates the word image with image data corresponding to a character string included in the selected word. Further, the word candidate selection unit 12 calculates an evaluation value for each word selected as a result of collation. In this case, the word candidate selection unit 12 selects, as word candidates, words having a higher evaluation value from among the plurality of words registered in the word dictionary. Note that the evaluation value is preferably a numerical value or a level value representing a degree of similarity or the like.

The verification unit 13 compares the first word candidate and the second word candidate character by character, and verifies a likelihood of the first word candidate based on the evaluation value obtained when the word image is recognized by characters determined as unmatched. For instance, the verification unit 13 specifies, by the comparison, the characters determined as unmatched in the character strings included in each of the first word candidate and the second word candidate. In this case, the verification unit 13 specifies the evaluation value when the word image input by the input unit 11 is recognized, based on the characters determined as unmatched. For instance, the verification unit 13 may calculate an evaluation value by collating the word image with the image data corresponding to the characters determined as unmatched. Alternatively, the verification unit 13 may use an evaluation value calculated in the word candidate selection unit 12, for the characters determined as unmatched. Then, the verification unit 13 determines whether at least the first word candidate is appropriate as the recognition result of the word image. In other words, the verification unit 13 verifies the likelihood of the word candidate as the recognition result of the word image.

Figure 2:
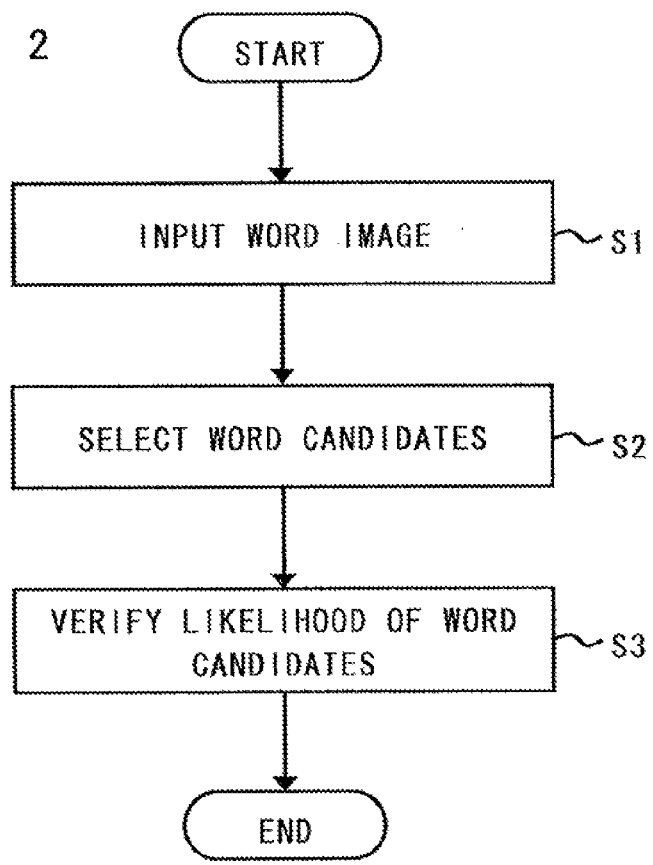
FIG. 2 is a flowchart showing a flow of a word recognition method according to the first exemplary embodiment of the present invention.

FIG. 2 is a flowchart showing a flow of a word recognition method according to the first exemplary embodiment. First, the input unit 11 inputs a word image (S1). For instance, the input unit 11 converts a sheet of paper printed with characters, such as an address, into an image by a scanner or the like, and receives it as a word image representing a word.

Next, the word candidate selection unit 12 selects word candidates (S2). For instance, the word candidate selection unit 12 collates the word image with image data corresponding to each of the plurality of words registered in the word dictionary. Then, the word candidate selection unit 12 selects at least two word candidates, which are relatively probable words for the word image, from among the plurality of words. That is, the at least two word candidates selected at this time are different words, but include a common character. In other words, the word candidates include matched portions in the character strings.

Then, the verification unit 13 verifies the likelihood of the word candidates (S3). For instance, the verification unit 13 compares the selected word candidates character by character. Further, the verification unit 13 specifies the characters determined as unmatched as a result of comparison. Furthermore, the verification unit 13 specifies the evaluation value when the word image is recognized for the specified characters. Then, the verification unit 13 verifies the likelihood of the word candidates as the recognition result of the word image, based on the specified evaluation value.

In this manner, even when a plurality of words including matched portions are selected as candidates for recognition, the word recognition apparatus 1 according to the first exemplary embodiment can improve the recognition accuracy. This is because the difference in the recognition results between the word candidates can be recognized in more detail by focusing on the evaluation value of the characters determined as unmatched, for the word candidates of similar recognition results.

<Second Exemplary Embodiment>

Figure 3:
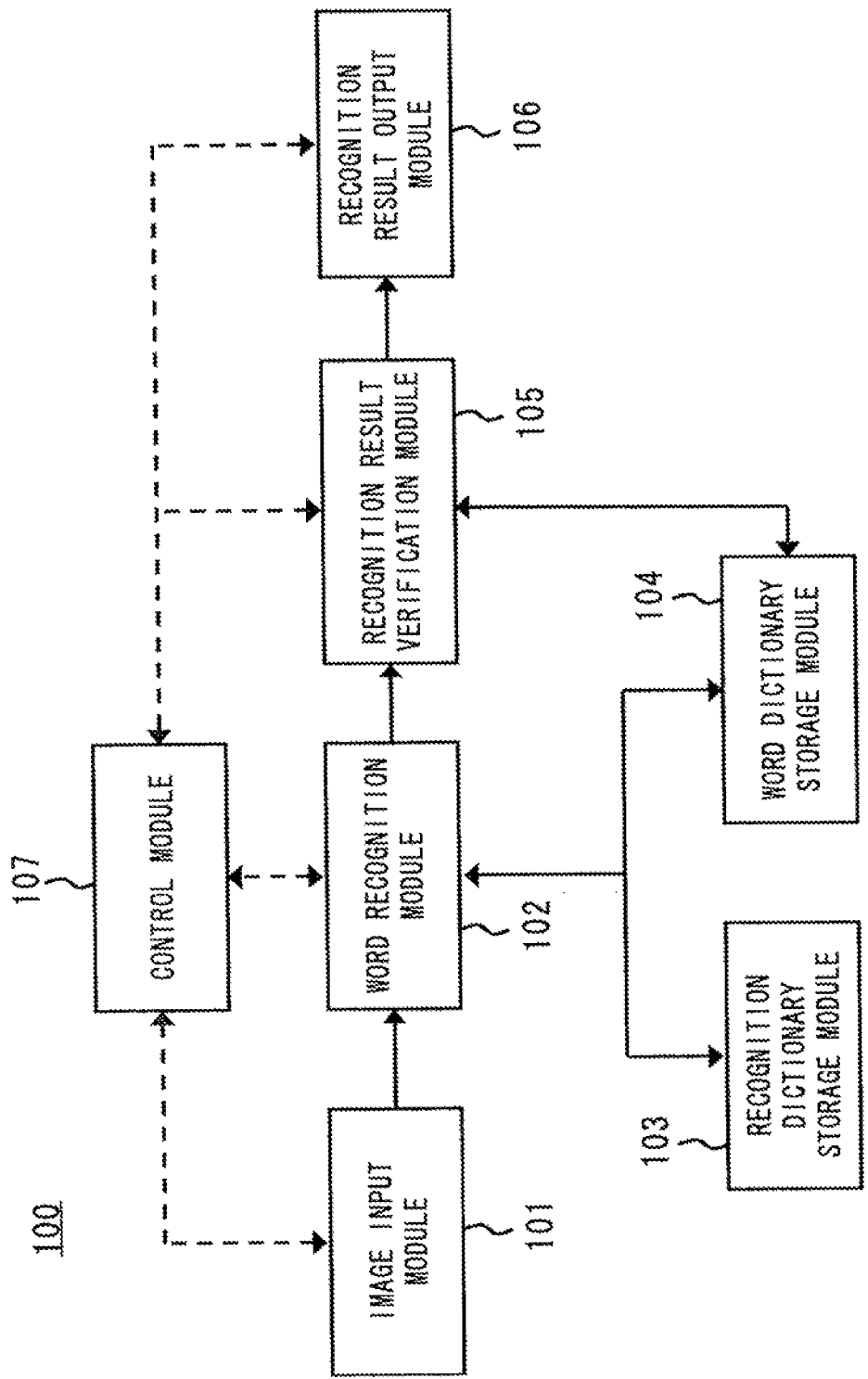
FIG. 3 is a block diagram showing a configuration of a word recognition apparatus according to a second exemplary embodiment of the present invention.

FIG. 3 is a block diagram showing a configuration of a word recognition apparatus 100 according to a second exemplary embodiment of the present invention. The word recognition apparatus 100 includes an image input module 101, a word recognition module 102, a recognition dictionary storage module 103, a word dictionary storage module 104, a recognition result verification module 105, a recognition result output module 106, and a control module 107.

The image input module 101 performs processing for scanning character strings printed on paper and converts it into a word image which is image data.

The word dictionary storage module 104 is a dictionary database that stores information about a plurality of words to be recognized when the word image is recognized. The information about the words is character string data or the like which includes a plurality of characters constituting each of the words. For instance, words to be recognized in the second exemplary embodiment may indicate place names or the like in hierarchically structured addresses as described above. However, the words to be recognized in the second exemplary embodiment are not limited thereto.

Figure 4:
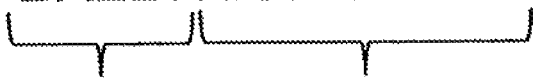
FIG. 4 is a diagram showing an example of similar addresses.

FIG. 4 shows an example of the dictionary database stored in the word dictionary storage module 104. FIG. 4 shows a part of the names of places within a city which belongs to an urban area named "MIDLETON". The eight names of places within the city shown in FIG. 4 start with a common character string "BALLY", and include different character strings after the character string "BALLY". Assume herein that a portion corresponding to "BALLY" is referred to as a matched portion and a portion other than "BALLY" is referred to as an unmatched portion.

The recognition dictionary storage module 103 is a dictionary database that stores standard image data for each character necessary for recognizing word images, as a standard pattern. Specifically, the recognition dictionary storage module 103 has registered therein standard patterns for each character as constituent elements of the words to be recognized. For instance, when the words stored in the word dictionary storage module 104 indicate an address in an English-speaking country, standard image data for lower-case letters "a" to "z", capital letters "A" to "Z", and numbers "0" to "9" may be registered in the recognition dictionary storage module 103 as standard patterns. As the standard patterns, average image data may be employed for each character type.

The word recognition module 102 sequentially selects the plurality of words stored in the word dictionary storage module 104, separates the word image, which is converted by the image input module 101, into characters depending on the selected word, and calculates evaluation values for the separated characters. Then, the word recognition module 102 performs processing for recognizing the word image using the calculated evaluation value. Specifically, the word recognition module 102 outputs a recognition result which is a result of recognizing the word image, and an evaluation value corresponding to the recognition result. The word recognition module 102 also outputs at least two word candidates which are the recognition results.

The recognition result verification module 105 compares, character by character, the first word candidate, which is a recognition result having a first evaluation value, with the second word candidate, which is a recognition result having a second evaluation value, among the recognition results output by the word recognition module 102. Then, the recognition result verification module 105 determines whether a portion matching a character string included in the second word candidate is present in a character string included in the first word candidate. When it is determined that a matched portion is present, the recognition result verification module 105 recalculates evaluation values for unmatched portions in the character strings included in the first word candidate and the second word candidate. Specifically, the recognition result verification module 105 replaces the evaluation values corresponding to the first and second word candidates with evaluation values recalculated from the evaluation values calculated by the word recognition module 102.

The recognition result output module 106 outputs a recognition result having the first evaluation value based on the evaluation values recalculated by the recognition result verification module 105. At this time, a comparison is made to determine whether the difference between the evaluation values recalculated for each of the first word candidate and the second word candidate is equal to or greater than a certain value. When it is not equal to or greater than the certain value, both the first word candidate and the second word candidate may be rejected without adopting them as the recognition results. When the ranks of the word candidates are changed depending on the evaluation values recalculated for each of the first word candidate and the second word candidate, both the first word candidate and the second word candidate may be rejected without adopting them as the recognition results. Determination as to whether to output the first word candidate as the recognition result, whether to output the second word candidate as the recognition result, or whether to reject both the first and second word candidates without adopting them as the recognition results is not limited to the above. For example, recognition errors may be reduced or a number of recognition results may be output by using evaluation values before recalculation for each of the first and second word candidates and a difference therebetween, recalculated evaluation values and a difference therebetween, characters constituting a unmatched portion and the length thereof, or the like. In this way, the determination may be made depending on the intended use.

The control module 107 controls operations of the image input module 101, the word recognition module 102, the recognition dictionary storage module 103, the word dictionary storage module 104, the recognition result verification module 105, and the recognition result output module 106. Specifically, the control module 107 controls the image input module 101 to input a word image representing a plurality of characters. The control module 107 also controls the word recognition module 102, the recognition dictionary storage module 103, and the word dictionary storage module 104 to recognize the input word image based on the plurality of words registered in the world dictionary and select the first word candidate and the second word candidate. Further, the control module 107 controls the recognition result verification module 105 to compare the first word candidate and the second word candidate character by character and verify the likelihood of the first word candidate based on the evaluation value obtained when the word image is recognized by characters determined as unmatched. Then, the control module 107 controls the recognition result output module 106 to output the results of verification in the recognition result verification module 105.

Figure 5:
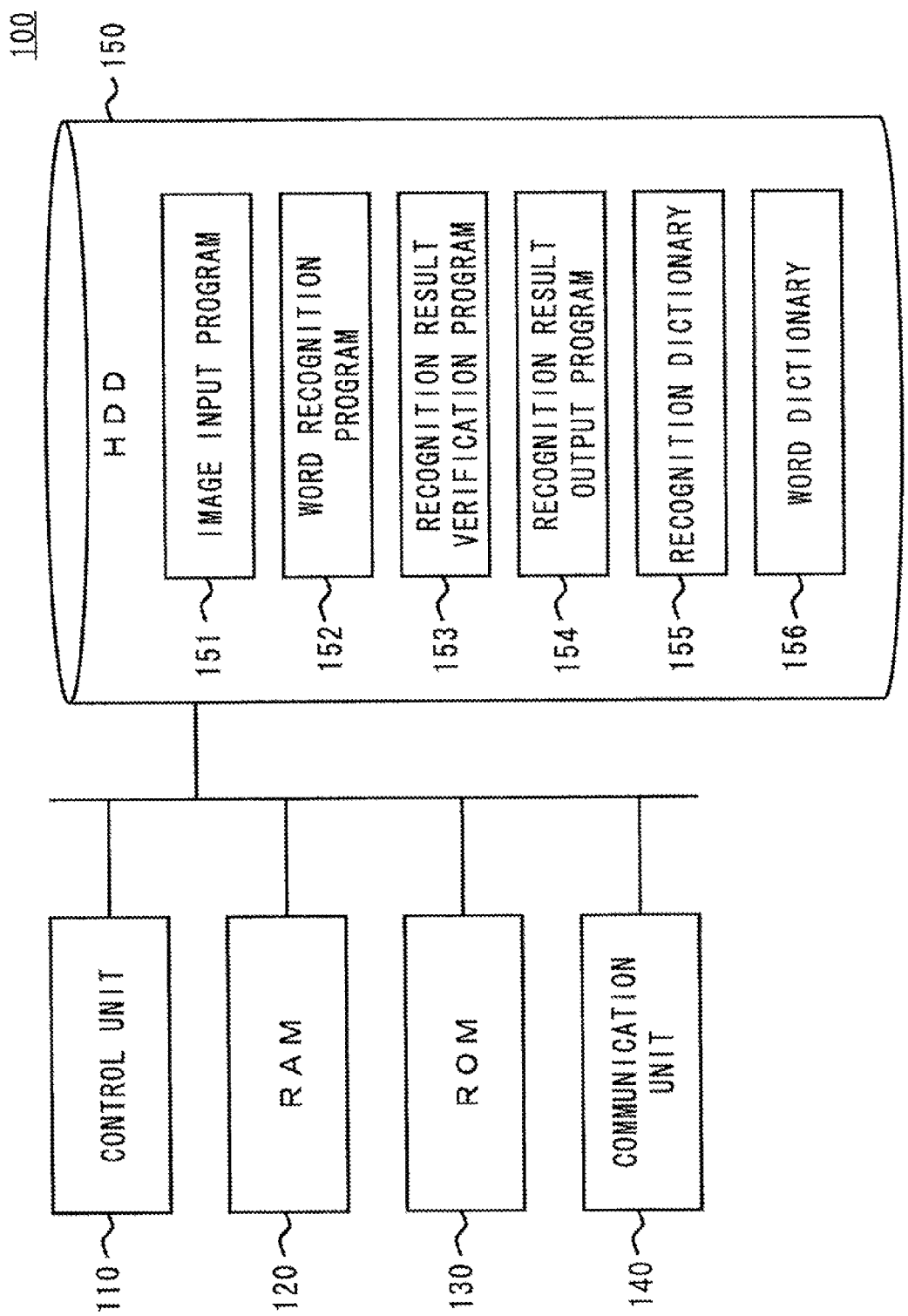
FIG. 5 is a block diagram showing a hardware configuration of the word recognition apparatus according to the second exemplary embodiment of the present invention.

The word recognition apparatus 100 can be implemented using a typical computer system. For example, FIG. 5 is a block diagram showing an exemplary configuration of hardware of the word recognition apparatus 100 according to the second exemplary embodiment of the present invention. The word recognition apparatus 100 includes a control unit 110, a RAM (Random Access Memory) 120, a ROM (Read Only Memory) 130, a communication unit 140, and an HDD (Hard Disk Drive) 150. The HDD 150 is a non-volatile storage device that stores an OS (Operating System) (not shown), an image input program 151, a word recognition program 152, a recognition result verification program 153, a recognition result output program 154, a recognition dictionary 155, and a word dictionary 156. Note that the recognition dictionary 155 and the word dictionary 156 may be stored in an external storage device, such as an HDD or SSD (Solid State Drive), which is provided separately from the HDD 150. The contents to be stored in the HDD 150 may be preliminarily stored in the ROM 130.

The recognition dictionary 155 implements the above-mentioned recognition dictionary storage module 103. The word dictionary 156 implements the above-mentioned word dictionary storage module 104. The image input program 151 implements the above-mentioned image input module 101. The word recognition program 152 implements the above-mentioned word recognition module 102. The recognition result verification program 153 implements the above-mentioned recognition result verification module 105. The recognition result output program 154 implements the above-mentioned recognition result output module 106.

Figure 6:
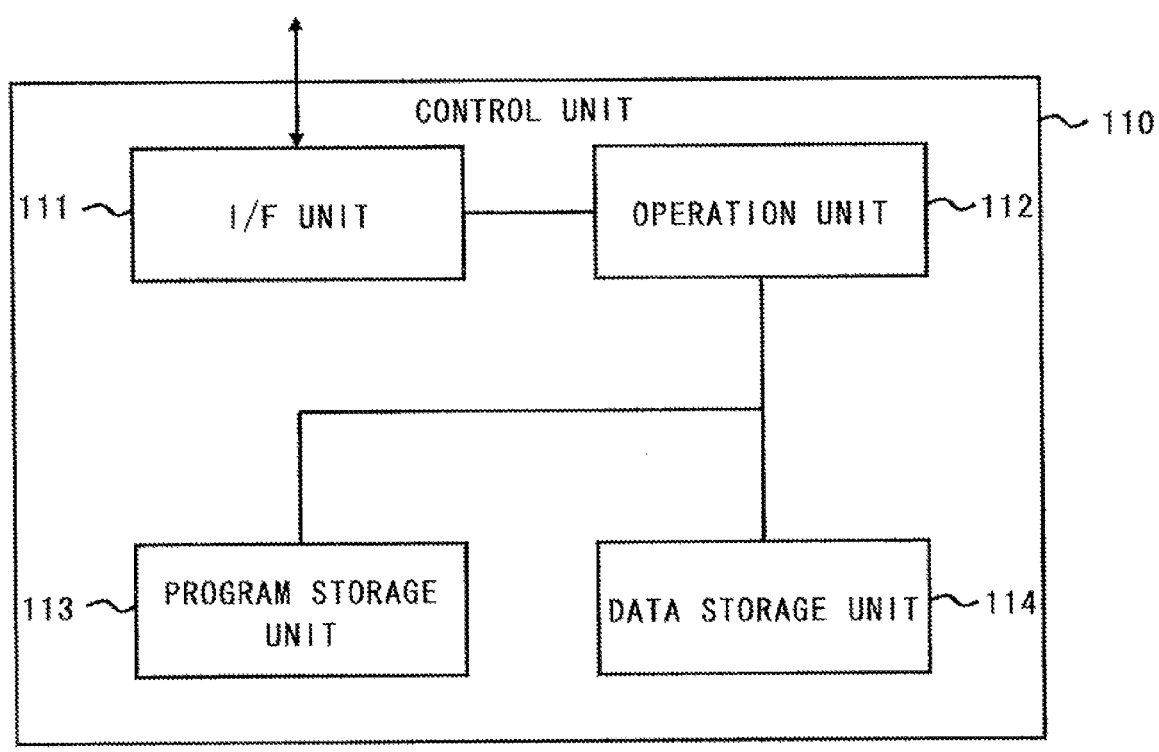
FIG. 6 is a block diagram showing a configuration of a control unit of the word recognition apparatus according to the second exemplary embodiment of the present invention.

The control unit 110 implements the above-mentioned control module 107. The control unit 110 is, for example, a CPU (Central Processing Unit). FIG. 6 is a block diagram showing the configuration of the control unit 110 of the word recognition apparatus 100 according to the second exemplary embodiment of the present invention. The control unit 110 includes an I/F unit 111, an operation unit 112, a program storage unit 113, and a data storage unit 114. The I/F unit 111 is a communications interface between the RAM 120, the ROM 130, the communication unit 140, and the HDD 150 shown in FIG. 5. The operation unit 112 is an arithmetic unit that executes a predetermined operation, such as a program, by referring to the I/F unit 111, the program storage unit 113, and the data storage unit 114. Each of the program storage unit 113 and the data storage unit 114 is a storage device such as a register that stores programs or data obtained from the RAM 120, the ROM 130, and the HDD 150.

The control unit 110 sequentially invokes and executes the image input module 101, the word recognition module 102, the recognition result verification module 105, and the recognition result output module 106 via the I/F unit 111. Specifically, in the word recognition apparatus 100, the control unit 110 reads and executes programs and data which are stored in the RAM 120, the ROM 130, and the HDD 150. Thus, the word recognition apparatus 100 operates as the image input module 101, the word recognition module 102, the recognition dictionary storage module 103, the word dictionary storage module 104, the recognition result verification module 105, the recognition result output module 106, and the control module 107.

Figure 7:
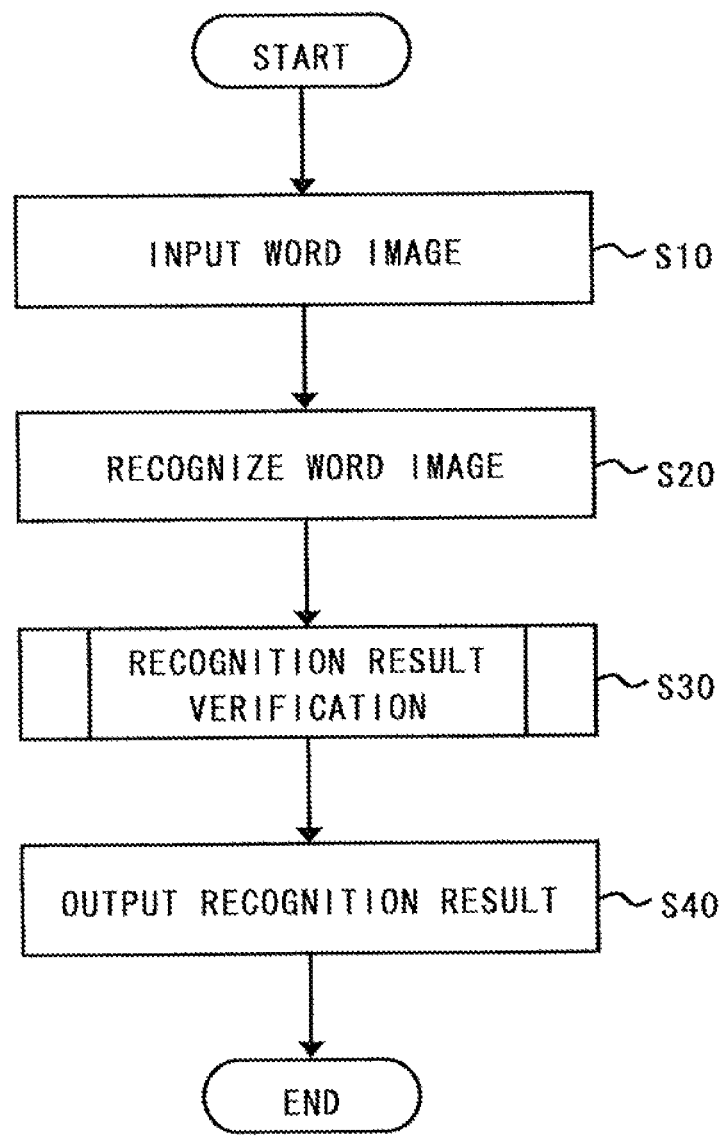
FIG. 7 is a flowchart showing a flow of a word recognition method according to the second exemplary embodiment of the present invention.

FIG. 7 is a flowchart showing a flow of a word recognition method according to the second exemplary embodiment of the present invention. First, the image input module 101 inputs a word image (S10). Next, the word recognition module 102 recognizes the word image by referring to the recognition dictionary storage module 103 and the word dictionary module 104 (S20). Specifically, the word recognition module 102 first selects word candidates one by one in a given order from among the plurality of words stored in the word dictionary module 104. Note that when a hierarchically structured address as described above is to be recognized, an upper-layer address is properly recognized, and thereafter, recognition targets of lower-layer addresses can be narrowed down to addresses belonging to the recognized address. For instance, the city named "MIDLETON" is appropriately recognized, and thereafter, the word recognition module 102 can select, in advance, words indicating the names of eight places in the city as shown in FIG. 4, which are the names of places belonging to the city named "MIDLETON", as word candidates.

Assume herein that the word recognition module 102 selects. "BALLYADAM" from among the names of places in the city shown in FIG. 4. Then, the word recognition module 102 calculates, for each character, an evaluation value indicating the degree to which the word image is similar to the selected word candidate. First, the word recognition module 102 divides the word image according to the character string length of the selected word candidate. For instance, when the selected word candidate is "BALLYADAM", the word recognition module 102 divides the word image into nine images, because the character string length is "9". For the division processing, it is preferable to use a method of taking a projection in the horizontal direction with respect to the input word image and dividing it at a minimum value or a valley point, for example.

Then, the word recognition module 102 determines the degree to which an image corresponding to a first character obtained by the division is similar to "B" which is the first character of the word candidate. Specifically, the word recognition module 102 performs collation with the character image "B" stored in the recognition dictionary storage module 103, and calculates an evaluation value. Similarly, the word recognition module 102 collates second to ninth characters of the word candidate with the second character "A" to the ninth character "M", respectively, and calculates an evaluation value for each character. Here, the evaluation value is preferably a degree of similarity, for example.

After that, the word recognition module 102 calculates an average value of the evaluation values corresponding to the first to ninth characters. Then, the word recognition module 102 uses the calculated average value as the evaluation value of the word candidate "BALLYADAM". Note that the reason for calculating the average value of the evaluation values for each character is that a comparison between word candidates having different character string lengths is made possible by normalization through division by the character string length. Alternatively, the word recognition module 102 may calculate the average value from evaluation values corresponding to part of the first to ninth characters. For instance, when the character string length is equal to or greater than a predetermined length, evaluation values corresponding to a plurality of sampled characters may also be used. The evaluation value for each word candidate is not limited to the average value for each character. In short, the word recognition module 102 may calculate the evaluation value for each word candidate by performing any statistical processing, such as distribution, on the evaluation value for each character. In other words, it is only necessary to perform normalization on the evaluation value for each word candidate so as to be compared with the evaluation value of another word candidate. Similarly, the word recognition module 102 also calculates evaluation values for the remaining word candidates stored in the word dictionary module 104.

FIG. 8 is a diagram illustrating the notation of recognition results according to the second exemplary embodiment of the present invention. A recognition result R1 can be represented by a set of r11, r12, ..., r1i, ..., r1m, which are recognition results for each character. Similarly, a recognition result R2 can be represented by a set of r21, r22, ..., r2j, ..., r2n, which are recognition results for each character. FIG. 9 is a diagram showing an example of the notation of recognition results according to the second exemplary embodiment of the present invention. Here, the recognition result R1 indicates that "BALLYTIVNAN" has been recognized. Similarly, the recognition result R2 indicates that "BALLYFARMAN" has been recognized. FIG. 10 is a diagram illustrating the notation of evaluation values corresponding to the recognition results according to the second exemplary embodiment of the present invention. An evaluation value set S1 which is a set of evaluation values corresponding to the characters of the recognition result R1 can be represented by a set of s11, s12, ..., s1i, ..., s1m. Similarly, an evaluation value set S2 which is a set of evaluation values corresponding to the characters of the recognition result R2 can be represented by a set of s21, s22, ..., s2i, ..., S2m. In the following description, the average value of the elements of the evaluation value set S1 is referred to as an evaluation average value S1avg, and the average value of the elements of the evaluation value set S2 is referred to as an evaluation average value S2avg. In the following description, assume that the evaluation average value S1avg is ranked first, and the evaluation average value S2avg is ranked second.

The word recognition module 102 outputs the recognition results and the evaluation values corresponding to the recognition results to the recognition result verification module 105 in descending order of the evaluation values. In other words, herein, the word recognition module 102 selects a first output recognition result as the first word candidate, and selects a second output recognition result as the second word candidate. Note that the word recognition module 102 does not have to output all the word candidates, but only needs to output at least the top two word candidates. Thus, the word recognition module 102 may determine in advance the number of word candidates to be output, based on a threshold. Alternatively, a predetermined ratio may be output depending on the number of word candidates. Specifically, in the case of recognizing an address, a place name having a higher evaluation value is selected. However, the order of output by the word recognition module 102 is not limited thereto. It is only necessary for the recognition result verification module 105 to be able to discriminate the order of recognition results.

The above-mentioned processing of the word recognition module 102 can be stated in another way. That is, the word recognition module 102 calculates, for each of the plurality of words, an evaluation value for each character when the word image is recognized as a plurality of characters, and selects the first word candidate and the second word candidate from among the plurality of words by using the calculated evaluation values.

It can be said that the word recognition module 102 calculates the evaluation values for each character when the word image is recognized as a plurality of characters, for each of a plurality of words, calculates the average value of the evaluation values calculated for all the characters included in each word, and selects the first word candidate and the second word candidate from among the plurality of words by using the calculated average value of the evaluation values.

Further, it can be said that the word recognition module 102 divides the word image into a plurality of images based on each of the plurality of words, calculates an evaluation value for each character when the plurality of divided images are recognized as characters included in the plurality of words, and selects the first word candidate and the second word candidate from among the plurality of words by using the calculated evaluation values.

Figure 11:
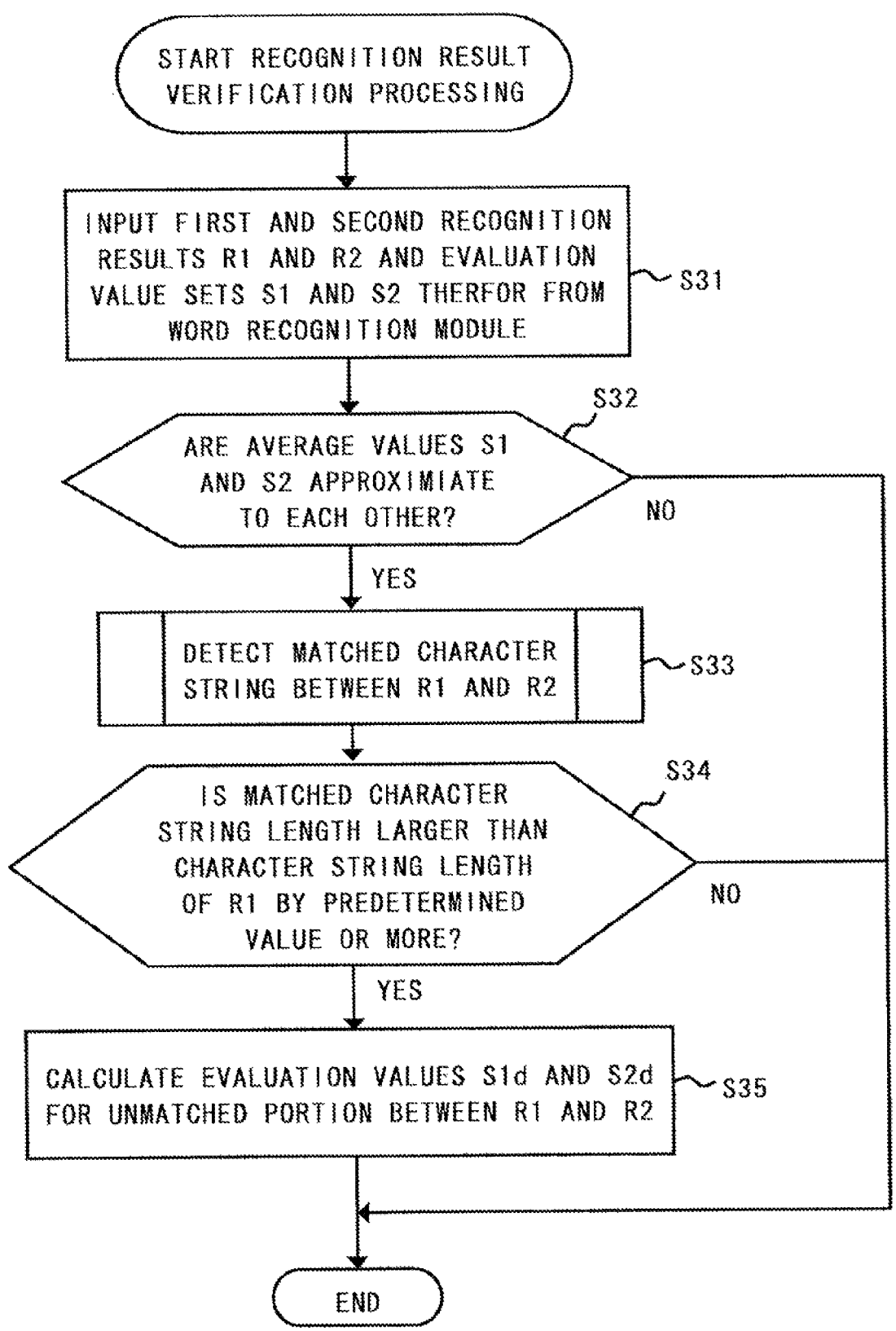
FIG. 11 is a flowchart showing a flow of recognition result verification processing according to the second exemplary embodiment of the present invention.

Then, returning to FIG. 7, the recognition result verification module 105 verifies the recognition result output by the word recognition module 102 (S30). FIG. 11 is a flowchart showing an exemplary flow of processing for verifying a recognition result according to the second exemplary embodiment of the present invention.

First, the recognition result verification module 105 receives, from the word recognition module 102, the recognition results R1 and R2, which indicate the first evaluation value and the second evaluation value, respectively, and the evaluation value sets S1 and S2 therefor (S31). At this time, the recognition result verification module 105 also receives the evaluation average value S1avg and the evaluation average value S2avg.

Next, the recognition result verification module 105 determines whether the evaluation average value S1avg and the evaluation average value S2avg are approximate to each other (S32). For instance, the recognition result verification module 105 determines whether the difference between the evaluation average value S1avg and the evaluation average value S2avg is equal to or smaller than a predetermined threshold. Specifically, the recognition result verification module 105 verifies the likelihood of the recognition result R1 when the evaluation average value S1avg of the recognition result R1 and the evaluation average value S2avg of the recognition result R2, which are obtained in the case where the word image is recognized in the word recognition module 102, are approximate to each other. In step S32, when it is determined that the evaluation average value S1avg and the evaluation average value S2avg are not approximate to each other, the verification processing ends. Thus, when the difference between the evaluation values of the recognition results is conspicuous, unnecessary processing is omitted, thereby enhancing the processing efficiency.

In step S32, when determining that the evaluation average value S1avg and the evaluation average value S2avg are approximate to each other, the recognition result verification module 105 detects a matched portion of the character string included in the recognition result R2 from the character string included in the recognition result R1 (S33). Specifically, the recognition result verification module 105 compares the recognition result R1 with the recognition result R2 character by character, and detects matched character strings which are character strings that partially match. Then, the recognition result verification module 105 determines unmatched characters between the recognition result R1 and the recognition result R2 by using the detected matched character strings. This makes it possible to effectively specify the characters to be determined as unmatched. Note that the processing of step S33 will be described in detail below with reference to FIGS. 12 and 13 which are described later.

Subsequently, the recognition result verification module 105 determines whether the length of the matched character string is equal to or greater than a predetermined value, as compared with the character string length of the recognition result R1 (S34). In step S34, when it is determined that the character length is smaller than the predetermined value, the verification processing ends. Specifically, when the matched character string detected in step S33 includes characters, the number of which exceeds a predetermined number of characters, the recognition result verification module 105 verifies the likelihood of the first word candidate. When the number of characters of the matched character string does not exceed a predetermined number of characters, the difference between the recognition result R1 and the recognition result R2 is conspicuous. Therefore, unnecessary processing is omitted, thereby enhancing the processing efficiency.

In step S34, when it is determined that the character length is equal to or greater than the predetermined value, the recognition result verification module 105 calculates re-evaluation average values S1$d$ and S2$d$ for the unmatched portion between the recognition results R1 and R2 (S35). In the case of the example shown in FIG. 9, the recognition result verification module 105 calculates the average value of evaluation values for four characters "TIVN" of the recognition result R1, thereby obtaining the re-evaluation average value S1$d$. Similarly, the recognition result verification module 105 calculates the average value of evaluation values for four characters "FARM" of the recognition result R2, thereby obtaining the re-evaluation average value S2$d$. In short, the recognition result verification module 105 uses the evaluation value for each character, which is calculated by the word recognition module 102, as the evaluation value for each of characters determined as unmatched. This makes it possible to effectively calculate the re-evaluation average values. Further, the recognition result verification module 105 averages the evaluation values for the characters determined as unmatched among the evaluation values for each character calculated by the word recognition module 102, thereby calculating the re-evaluation average values S1$d$ and S2$d$ for the characters determined as unmatched. This makes it possible to appropriately compare the recognition result R1 with the recognition result R2 based on the normalized evaluation values.

Returning to FIG. 7, thereafter, the recognition result output module 106 outputs the recognition results output by the recognition result verification module 105 (S40). Here, the recognition result output module 106 may output only the recognition result indicating the first evaluation value, on the basis of the results of the evaluation value recalculated by the recognition result verification module 105. Alternatively, the recognition result output module 106 may output the recognition results in the order of the evaluation values; on the basis of the results of the recognition result verification module 105. More alternatively, the recognition result output module 106 may output the recognition results, the evaluation value sets, and the evaluation average values. Note that the recognition result output module 106 may output "reject" when the difference between the first evaluation value and the second evaluation value is equal to or smaller than the predetermined value.

Figure 12:
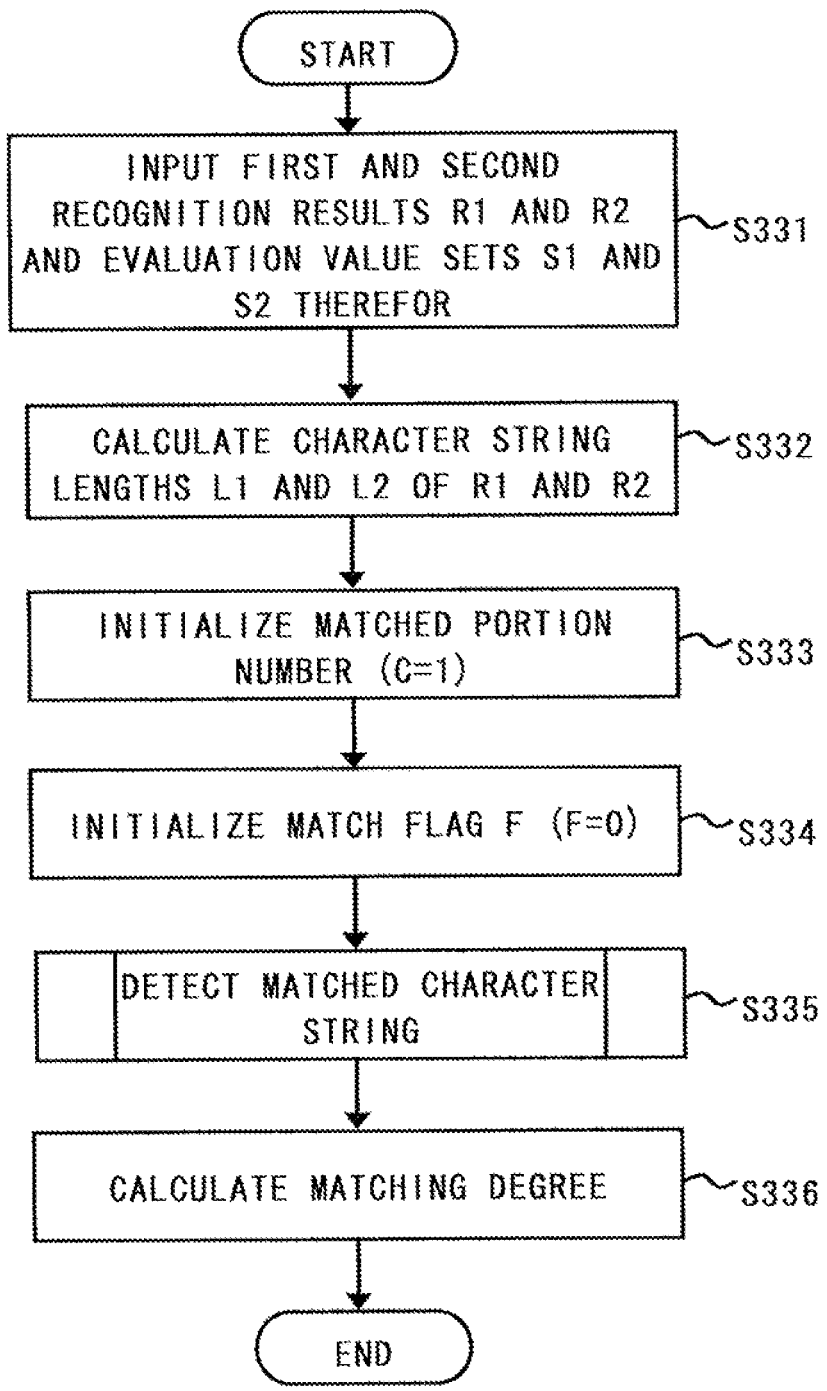
FIG. 12 is a flowchart showing a flow of processing for detecting a matched portion of the recognition results according to the second exemplary embodiment of the present invention.

FIG. 12 is a flowchart showing a flow of processing (step S33 in FIG. 11) for detecting a matched portion of a recognition result according to the second exemplary embodiment of the present invention. First, the recognition result verification module 105 receives the recognition results R1 and R2, which indicate the first evaluation value and the second evaluation value, respectively, and the evaluation value sets S1 and S2 therefor (S331). Next, the recognition result verification module 105 calculates character string lengths L1 and L2 of the recognition results R1 and R2 (S332). Subsequently, the recognition result verification module 105 initializes a matched portion number C for use in counting matched portions within character strings included in the recognition results R1 and R2 (S333). Specifically, the recognition result verification module 105 sets "1" to the matched portion number C. Then, the recognition result verification module 105 initializes a match flag F (S334). Specifically, the recognition result verification module 105 sets "0" to the match flag F so as to continuously detect matched portions.

Figure 13:
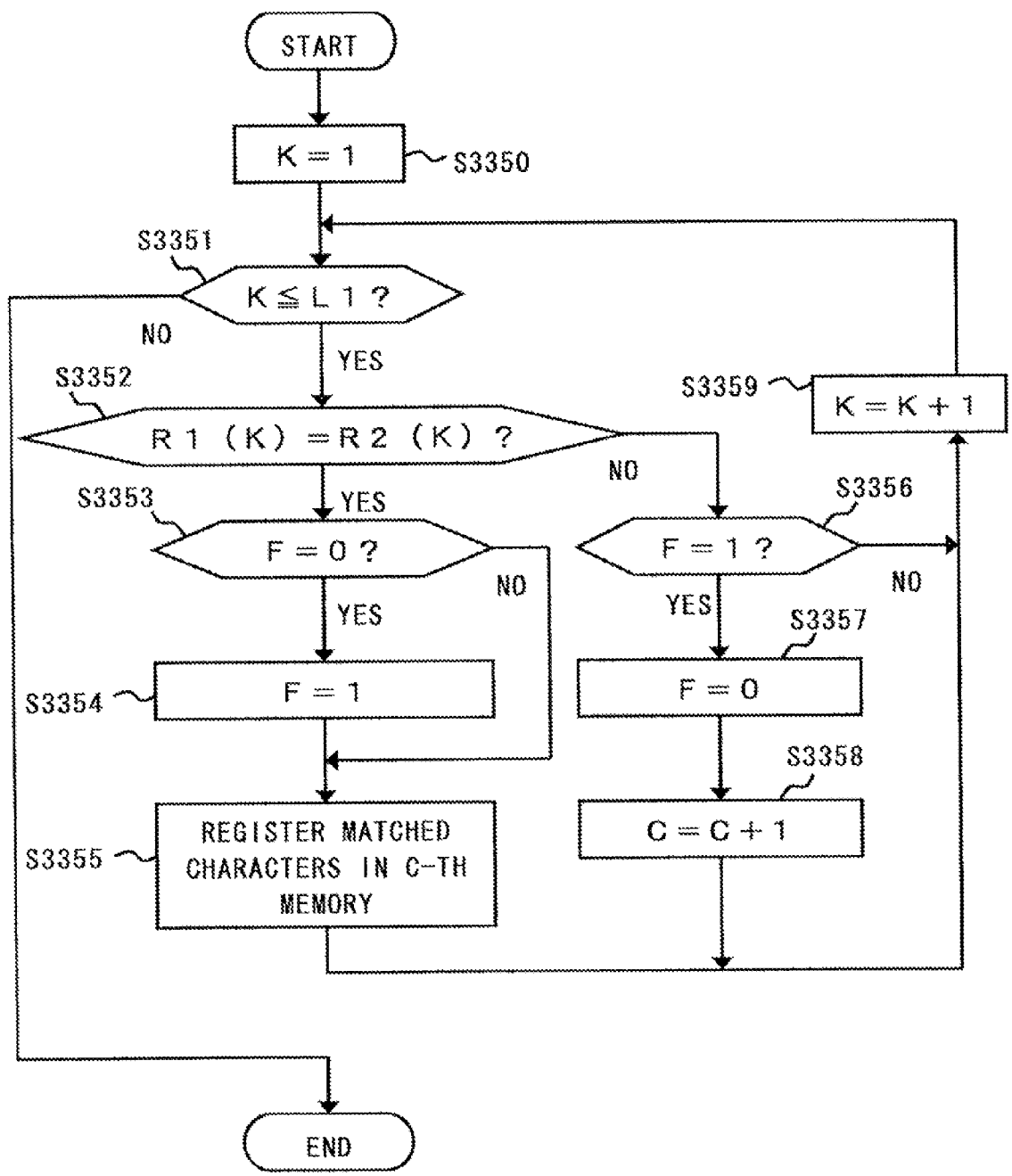
FIG. 13 is a flowchart showing a detailed flow of the processing for detecting a matched portion of the recognition results according to the second exemplary embodiment of the present invention.

After that, the recognition result verification module 105 detects a matched character string (S335). FIG. 13 is a flowchart showing a detailed flow of processing (step S335 in FIG. 12) for detecting a matched portion of a recognition result according to the second exemplary embodiment of the present invention. First, the recognition result verification module 105 initializes a loop counter K (S3350). Specifically, the recognition result verification module 105 sets "1" to the loop counter K. This is because, in FIG. 13, the following processing is repeatedly executed for characters ranging from the first character to the last or L1-th character in the character string included in the recognition result R1.

Next, the recognition result verification module 105 determines whether the loop counter K indicates a value equal to or smaller than the character string length L1 (S3351). In step S3351, when determining that the loop counter K indicates a value equal to or smaller than the character string length L1, the recognition result verification module 105 determines whether the loop counter K-th character of the recognition result R1 matches that of the recognition result R2 (S3352). In step S3352, when determining that the K-th characters match each other, the recognition result verification module 105 determines whether the match flag F indicates "0" (S3353). Specifically, it is determined whether a preceding character of the character string included in the recognition result R1 matches that of the character string included in the recognition result R2.

In step S3353, when determining that the match flag F indicates "0", the recognition result verification module 105 sets "1" to the match flag F (S3354). In other words, it is set that characters starting from the K-th character are matched. After that, the process proceeds to step S3355. Note that in step S3353, when it is determined that the match flag F does not indicate "0", for example, when the match flag F indicates "1", step S3353 is not carried out and the process proceeds to step S3355. After that, the recognition result verification module 105 registers the matched K-th character in a C-th memory (S3355). Then, the process proceeds to step S3359.

In step S3352, when determining that the K-th characters do not match each other, the recognition result verification module 105 determines whether the match flag F indicates "1" (S3356).

In step S3353, when determining that the match flag F indicates "1", the recognition result verification module 105 sets "0" to the match flag F (S3357). In other words, it is set that characters starting from the K-th character are unmatched. Then, the recognition result verification module 105 adds "1" to the matched portion number C (S3358). After that, the process proceeds to step S3359. Meanwhile, in step S3353, when determining that the match flag F does not indicate "1", for example, when the match flag F indicates "0", the process proceeds to step S3359.

After that, the recognition result verification module 105 adds "1" to the loop counter K (S3359) for comparison with subsequent characters. In step S3351, when it is determined that the loop counter K indicates a value greater than the character string length L1, the processing ends.

Figure 14:
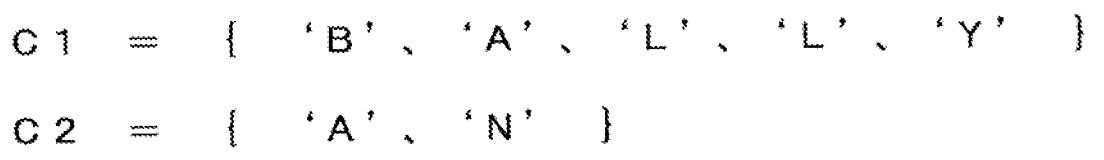

FIG. 14 is a diagram showing a detection example of a matched portion of a recognition result according to the second exemplary embodiment of the present invention. FIG. 14 shows matched character strings C1 and C2 when the recognition result R1 indicating the first-class evaluation value is "BALLYTIVNAN", and the recognition result R2 indicating the second evaluation value is "BALLYFARMAN". The matched character string C1 is a matched character string obtained when the matched portion number C is "1". Here, the matched character string C1 is "BALLY". The matched character string C2 is a matched character string obtained when the matched portion number C is "2". Here, the matched character string C2 is "AN".

Returning to FIG. 12, the recognition result verification module 105 calculates a matching degree (S336). For instance, the recognition result verification module 105 calculates the matching degree by using the character string length L1 of "11" of the recognition result R1. Here, the matching degree is expressed as (5+2)/11=0.64. Accordingly, when a value equal to or greater than 0.5 is set as a threshold, it is determined in step S34 of FIG. 11 that the length of the matched character string is equal to or greater than the predetermined value, compared with the character string length of the recognition result R1.

In sum, it can be said that the recognition result verification processing according to the second exemplary embodiment of the present invention is carried out as follows. That is, a first unmatched character string, which is a character string obtained by excluding matched character strings from the recognition result R1, is extracted; a second unmatched character string, which is a character string obtained by excluding matched character strings from the recognition result R2 is extracted; and the likelihood of the recognition result R1 is verified based on an evaluation value obtained when the word image is recognized by the first unmatched character string and based on an evaluation value obtained when the word image is recognized by the second unmatched character string. Thus, only the evaluation values of the unmatched character strings are compared with each other. This makes it possible to clarify the difference and improve the verification accuracy.

Further, in the recognition result verification processing according to the second exemplary embodiment of the present invention, when the evaluation value obtained when the word image is recognized by the first unmatched character string is larger, by the predetermined value, than the evaluation value obtained when the word image is recognized by the second unmatched character string, the first word candidate may be used as the recognition result for the input word image, and when it is smaller by the predetermined value, the first and second word candidates for the input word image may be rejected to determine that there is no recognition result. Thus, the first word candidate can be used as the recognition result only when the difference is larger, thereby improving the verification accuracy.

Alternatively, in the recognition result verification processing according to the second exemplary embodiment of the present invention, when one of the evaluation value obtained when the word image is recognize by the first unmatched character string and the evaluation value obtained when the word image is recognized by the second unmatched character string is greater than the other by the predetermined value, one of the first and second word candidates having a larger evaluation value may be used as the recognition result for the input word image. Meanwhile, when it is smaller by the predetermined value, the first and second word candidates for the input word image may be rejected to determine that there is no recognition result. Consequently, a more probable candidate is selected as the recognition result from the first and second word candidates, thereby improving the verification accuracy.

<Third Exemplary Embodiment>

Figure 15:
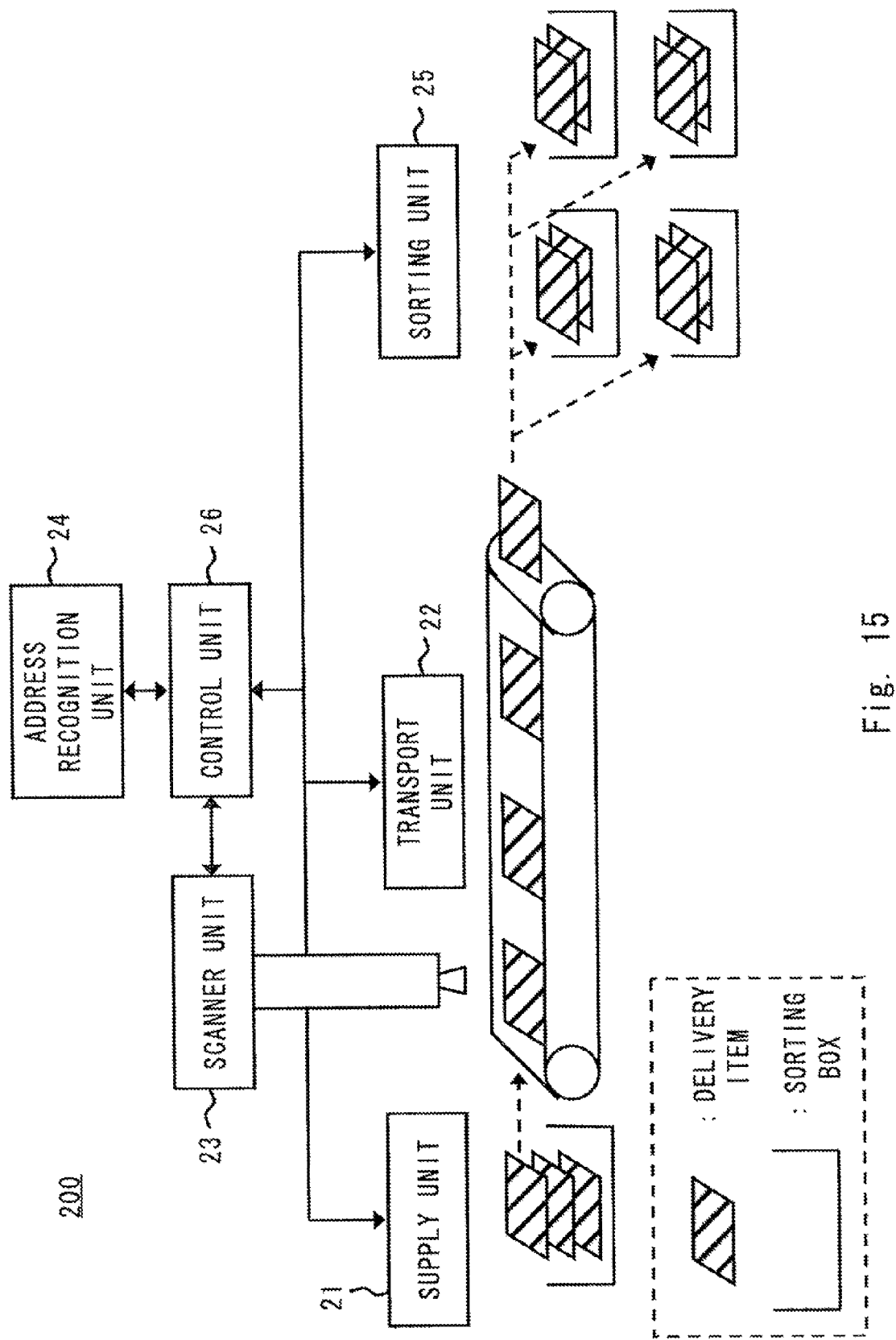
FIG. 15 is a diagram showing an example of a delivery item sorter including a word recognition apparatus according to a third exemplary embodiment of the present invention.

FIG. 15 is a diagram showing an example of a delivery item sorting apparatus 200 according to a third exemplary embodiment of the present invention. The delivery item sorting apparatus 200 treats thin items as delivery items. The delivery items are booklet parcels, envelopes, and postcards, for example, and also include mails. The delivery item sorting apparatus 200 includes a supply unit 21, a transport unit 22, a scanner unit 23, an address recognition unit 24, a sorting unit 25, and a control unit 26.

The supply unit 21 supplies delivery items to the transport unit 22 one by one. The transport unit 22 transports the delivery items supplied from the supply unit 21 to the sorting unit 25. The scanner unit 23 captures an image of each delivery item supplied from the supply unit 21 to the transport unit 22, and converts it into image data. The address recognition unit 24 recognizes the destination address of each delivery item from the image data obtained through conversion by the scanner unit 23. Here, the address recognition unit 24 is an example of the application of the word recognition apparatus 1 according to the first exemplary embodiment of the present invention or the word recognition apparatus 100 according to the second exemplary embodiment of the present invention. The sorting unit 25 sorts the delivery items transported by the transport unit 22 into sorting boxes assigned to each destination address recognized by the address recognition unit 24. The control unit 26 controls operations of the supply unit 21, the transport unit 22, the scanner unit 23, the address recognition unit 24, and the sorting unit 25.

An implementation example, such as Patent Literature 2, can be employed as the delivery item sorting apparatus 200. This enables the address recognition unit 24 to provide proper sorting without rejecting any candidate even when the recognition result of the destination address of a delivery item shows the first evaluation value of "BALLYTIVNAN" and the second evaluation value of "BALLYFARMAN".

<Other Exemplary Embodiments>

The verification unit 13 according to the first exemplary embodiment of the present invention or the recognition result verification module 105 according to the second exemplary embodiment of the present invention may compare the first word candidate and the second word candidate character by character based on an edit distance that is the number of edit operations for editing characters upon conversion from the first word candidate to the second word candidate. In other words, an edit distance for use in a character string search may be used to detect a matched portion. The edit distance is a measure for evaluation of the similarity between two character strings. In the edit distance, a shift from the first character string to the second character string is treated as an action of deletion, replacement, or addition of characters. The edit distance is obtained such that each time an action occurs, the action is added as a distance.

Further, in the edit distance, no action occurs when the characters included in the compared portions are the same. For instance, in the case of the same word, the edit distance is "0". Meanwhile, in the case of different words "aaa" and "aab", one replacement action occurs, and thus the edit distance is "1". The edit distance may be calculated by dynamic programming. Furthermore, results of the dynamic programming are subjected to back tracking, thereby making it possible to detect the portion including the same characters (portion in which no action occurs). In the example of FIG. 9 showing the word candidate "BALLYTIVNAN" having the first evaluation value and the word candidate "BALLYFARMAN" having the second evaluation value two matched character strings are detected as the edit distance.

The above first and second exemplary embodiments exemplify the recognition results indicating the first evaluation value and the second evaluation value. Alternatively, if the matched character string between the recognition results indicating the first and second evaluation values is also included in a recognition result indicating the third and subsequent evaluation values, the evaluation value can be calculated in a similar manner.

As a method for recognizing words including an address, there are known a method in which the entire word is recognized at a time and a method in which each word is separated into characters. The above first and second exemplary embodiments exemplify the latter method, but the method is not limited thereto. That is, the method for recognizing the entire word at a time may also be employed.

By simply applying the word driven recognition method described above to the example shown in FIG. 4, the address recorded on the paper is scanned and converted into a word image, and the name of city included in the word image is recognized as "MIDLETON", to thereby narrow down the city names to eight names as shown in FIG. 4. However, as shown in FIG. 4, when partially matched characters are included, the difference between the first evaluation value and the second evaluation value is not sufficiently large. Thus, there are a case where the first recognition result may not be adopted, and a case where the first recognition result may be erroneous. The former case is referred to as "rejection" and the latter case is referred to as "misreading". In the case of "rejection", manual input is required, while in the latter case, it is necessary to manually correct an error by checking recognition results with eyes.

Meanwhile, a pair of similar words may be registered in advance as a confusion table, and when the registered similar words appear in the recognition result, predetermined processing may be executed.

However, the use of the confusion table has a problem in that the confusion table operates only on the pre-registered words based on findings from the prior evaluation. Accordingly, if similar words including a matched portion appear in the other recognition results, "rejection" or "misreading" occurs. In a preliminary design phase, effort is required to select similar words in advance.

Meanwhile, in the exemplary embodiments of the present invention, matched character strings can be detected by comparing word candidates character by character, and unmatched character strings can be specified based on the detected matched character strings. This makes it possible to deal with unknown similar words. Furthermore, this saves the effort of selecting similar words in advance.

On the other hand, Patent Literature 1 does not require pre-registration and is effective for a whole range of similar words including a matched portion. However, only the weighting of evaluation values is performed on the first candidate and the second and subsequent candidates having the evaluation values, the difference between which is small. Further, in Patent Literature 1, the degree of difference is corrected based on the difference in number of characters between similar words to be compared. Accordingly, if there is no difference in number of characters between the similar words to be compared, the effect of correcting the degree of difference cannot be obtained.

Meanwhile, in the exemplary embodiments of the present invention, as shown in FIG. 9, even when the similar words to be compared include the same number of characters, re-evaluation values are calculated from the evaluation values for the characters determined as unmatched. Consequently, the difference becomes more conspicuous, and the recognition accuracy can be enhanced.

The present invention has an advantageous effect that the difference between the evaluation values of the first recognition result and the second and subsequent recognition results becomes conspicuous, since only the unmatched portions between similar words are extracted and compared with each other. Furthermore, the number of rejections is significantly reduced, and the recognition performance is improved.

The present invention is industrially applicable to OCR (Optical Character Recognition) or as a sorter for reading an address on each mail and sorting mails for each area.

Moreover, the present invention is not limited to the exemplary embodiments described above, but can be modified in various manners without departing from the above-mentioned scope of the present invention. For instance, in the above exemplary embodiments, the present invention has been described with respect to a hardware configuration, but the present invention is not limited thereto. According to the present invention, any processing can be implemented by causing a CPU (Central Processing Unit) to execute a computer program. In this case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary note 1) A word recognition apparatus comprising:

input means for inputting a word image representing a plurality of characters;

word candidate selection means for recognizing the word image input by the input means and selecting a first word candidate and a second word candidate based on a plurality of words registered in a word dictionary; and verification means for comparing the first word candidate and the second word candidate character by character and verifying a likelihood of the first word candidate based on an evaluation value obtained when the word image is recognized by characters determined as unmatched.

(Supplementary note 2) The word recognition apparatus according to Supplementary note 1, wherein the verification means compares the first word candidate and the second word candidate character by character based on an edit distance indicating the number of operations for editing characters upon conversion from the first word candidate to the second word candidate.

(Supplementary note 3) The word recognition apparatus according to Supplementary note 1 or 2, wherein the word candidate selection means calculates, for each of the plurality of words, an evaluation value for each character when the word image is recognized as a plurality of characters, and selects the first word candidate and the second word candidate from among the plurality of words by using the calculated evaluation value, and the verification means uses the evaluation value for each character calculated by the word candidate selection means, as the evaluation value for each of the characters determined as unmatched.

(Supplementary note 4) The word recognition apparatus according to any one of Supplementary notes 1 to 3, wherein the verification means compares the first word candidate and the second word candidate character by character, detects a matched character string which is a partially matched character string, and determines unmatched characters between the first word candidate and the second word candidate by using the detected matched character string.

(Supplementary note 5) The word recognition apparatus according to Supplementary note 4, wherein the verification means extracts a first unmatched character string which is a character string obtained by excluding the matched character string from the first word candidate, extracts a second unmatched character string which is a character string obtained by excluding the matched character string from the second word candidate, and verifies a likelihood of the first word candidate based on an evaluation value obtained when the word image is recognized by the first unmatched character string and on an evaluation value obtained when the word image is recognized by the second unmatched character string.

(Supplementary note 6) The word recognition apparatus according to Supplementary note 5, wherein the verification means determines the first word candidate as a recognition result for the input word image, when the evaluation value obtained when the word image is recognized by the first unmatched character string is larger by a predetermined value or more than the evaluation value obtained when the word image is recognized by the second unmatched character string, and the verification means rejects the first and second word candidates and determines that there is no recognition result, when the evaluation value obtained when the word image is recognized by the first unmatched character string is not larger by the predetermined value or more than the evaluation value obtained when the word image is recognized by the second unmatched character string.

(Supplementary note 7) The word recognition apparatus according to Supplementary note 5, wherein the verification means determines one of the first and second word candidates having a larger evaluation value as a recognition result for the input word image, when one of the evaluation value obtained when the word image is recognized by the first unmatched character string and the evaluation value obtained when the word image is recognized by the second unmatched character string is larger by a predetermined value or more than the other, and the verification means rejects the first and second word candidates for the input word image and determines that there is no recognition result, when one of the evaluation value obtained when the word image is recognized by the first unmatched character string and the evaluation value obtained when the word image is recognized by the second unmatched character string is not larger by the predetermined value or more than the other.

(Supplementary note 8) The word recognition apparatus according to any one of Supplementary notes 4 to 7, wherein the verification means verifies a likelihood of the first word candidate when the detected matched character string exceeds a predetermined number of characters.

(Supplementary note 9) The word recognition apparatus according to any one of Supplementary notes 1 to 8, wherein the word candidate selection means calculates, for each of the plurality of words, an evaluation value for each character when the word image is recognized as a plurality of characters, calculates an average value of the calculated evaluation values for all characters included in each word, and selects the first word candidate and the second word candidate from among the plurality of words by using the calculated average value of the evaluation values, and the verification means averages the evaluation values for characters determined as unmatched among the evaluation values for each character calculated by the ward candidate selection means, and calculates the evaluation values for characters determined as unmatched.

(Supplementary note 10) The word recognition apparatus according to any one of Supplementary notes 1 to 9, wherein the verification means verifies a likelihood of the first word candidate when an evaluation value for the first word candidate is approximate to an evaluation value for the second word candidate when the word image is recognized in the word candidate selection means.

(Supplementary note 11) The word recognition apparatus according to any one of Supplementary notes 1 to 10, wherein the word candidate selection means divides the word image into a plurality of images based on the plurality of words, calculates, for each of the plurality of divided images, an evaluation value for each character when the plurality of divided images are recognized as characters included in the plurality of words, and selects the first word candidate and the second word candidate from among the plurality of words by using the calculated evaluation value.

(Supplementary note 12) A word recognition method including:

an input step of inputting a word image representing a plurality of characters;

a word candidate selection step of recognizing the word image input by the input step and selecting a first word candidate and a second word candidate based on a plurality of words registered in a word dictionary; and a verification step of comparing the first word candidate and the second word candidate character by character and verifying a likelihood of the first word candidate based on an evaluation value obtained when the word image is recognized by characters determined as unmatched.

(Supplementary note 13) The word recognition method according to Supplementary note 12, wherein the verification step includes comparing the first word candidate and the second word candidate character by character based on an edit distance indicating the number of operations for editing characters upon conversion from the first word candidate to the second word candidate.

(Supplementary note 14) The word recognition method according to Supplementary note 12 or 13, wherein the word candidate selection step includes calculating, for each of the plurality of words, an evaluation value for each character when the word image is recognized as a plurality of characters, for each of the plurality of words, and selecting the first word candidate and the second word candidate from among the plurality of words by using the calculated evaluation value, and the verification step uses the evaluation value for each character calculated by the word candidate selection step, as the evaluation value for characters determined as unmatched.

(Supplementary note 15) The word recognition method according to any one of Supplementary notes 12 to 14, wherein the verification step includes comparing the first word candidate and the second word candidate character by character, detecting a matched character string which is a partially matched character string, and determining unmatched characters between the first word candidate and the second word candidate by using the matched character string.

(Supplementary note 16) The word recognition method according to Supplementary note 15, wherein the verification step includes extracting a first unmatched character string which is a character string obtained by excluding the matched character string from the first word candidate, extracting a second unmatched character string which is a character string obtained by excluding the Matched character string from the second word candidate, and verifying a likelihood of the first word candidate based on an evaluation value obtained when the word image is recognized by the first unmatched character string and on an evaluation value obtained when the word image is recognized by the second unmatched character string.

(Supplementary note 17) The word recognition method according to Supplementary note 16, wherein the verification step includes determining the first word candidate as a recognition result for the input word image, when the evaluation value obtained when the word image is recognized by the first unmatched character string is larger by a predetermined value or more than the evaluation value obtained when the word image is recognized by the second unmatched character string, and rejecting the first and second word candidates and determining that there is no recognition result, when the evaluation value obtained when the word image is recognized by the first unmatched character string is not larger by the predetermined value or more than the evaluation value obtained when the word image is recognized by the second unmatched character string.

(Supplementary note 18) The word recognition method according to Supplementary note 16, wherein the verification step includes determining one of the first and second word candidates having a larger evaluation value as a recognition result for the input word image, when one of the evaluation value obtained when the word image is recognized by the first unmatched character string and the evaluation value obtained when the word image is recognized by the second unmatched character string is larger by a predetermined value or more than the other, and rejecting the first and second word candidates for the input word image and determining that there is no recognition result, when one of the evaluation value obtained when the word image is recognized by the first unmatched character string and the evaluation value obtained when the word image is recognized by the second unmatched character string is not larger by the predetermined value or more than the other.

(Supplementary note 19) The word recognition method according to any one of Supplementary notes 15 to 18, wherein the verification step includes verifying a likelihood of the first word candidate when the detected matched character string exceeds a predetermined number of characters.

(Supplementary note 20) The word recognition method according to any one of Supplementary notes 12 to 19, wherein the word candidate selection step includes calculating, for each of the plurality of words, an evaluation value for each character when the word image is recognized as a plurality of characters, calculating an average value of the calculated evaluation values for all characters included in each word, and selecting the first word candidate and the second word candidate from among the plurality of words by using the calculated average value of the evaluation values, and the verification step includes averaging the evaluation values for characters determined as unmatched among the evaluation values for each character calculated by the word candidate selection means, and calculating the evaluation values for characters determined as unmatched.

(Supplementary note 21) The word recognition method according to any one of Supplementary notes 12 to 20, wherein the verification step verifies a likelihood of the first word candidate when an evaluation value for the first word candidate is approximate to an evaluation value for the second word candidate when the word image is recognized in the word candidate selection step.

(Supplementary note 22) The word recognition method according to any one of Supplementary notes 12 to 21, wherein the word candidate selection step includes dividing the word image into a plurality of images based on the plurality of words, calculating, for each of the plurality of divided images, an evaluation value for each character when the plurality of divided images are recognized as characters included in the plurality of words, and selecting the first word candidate and the second word candidate from among the plurality of words by using the calculated evaluation value.

(Supplementary note 23) A word recognition program that causes a computer to execute:

input processing for inputting a word image representing a plurality of characters;

word candidate selection processing for recognizing the word image input by the input processing and selecting a first word candidate and a second word candidate based on a plurality of words registered in a word dictionary; and verification processing for comparing the first word candidate and the second word candidate character by character and verifying a likelihood of the first word candidate based on an evaluation value obtained when the word image is recognized by characters determined as unmatched.

(Supplementary note 24) A delivery item sorting apparatus comprising:

a supply unit that supplies delivery items one by one;

a transport unit that transports the delivery items;

a scanner unit that captures an image of each of the delivery items and converts the image into image data;

an address recognition unit that recognizes a destination address of the delivery item from the image data;

a sorting unit that sorts the delivery items into sorting boxes assigned to each destination address recognized by the address recognition unit; and a control unit that controls operations of the supply unit, the transport unit, the scanner unit, the address recognition unit, and the sorting unit, wherein the address recognition unit comprises a word recognition apparatus according to any one of Supplementary notes 1 to 11.

The present invention has been described above with reference to exemplary embodiments, but the present invention is not limited to the exemplary embodiments. The configuration and details of the present invention may be modified in various manners which can be understood by those skilled in the art within the scope of the present invention.

This application is based upon and claims the benefit of priority from Japanese patent application No. 2009-218465, filed on Sep. 24, 2009, and Japanese patent application No. 2010-062566, filed on Mar. 18, 2010, the disclosure of which is incorporated herein in its entirety by reference.

INDUSTRIAL APPLICABILITY

The present invention is industrially applicable to OCR (Optical Character Recognition), reading addresses on mails, and as a sorter for sorting for each area.

REFERENCE SIGNS LIST

1 WORD RECOGNITION APPARATUS
11 INPUT UNIT
12 WORD CANDIDATE SELECTION UNIT
12 VERIFICATION UNIT
100 WORD RECOGNITION APPARATUS
101 IMAGE INPUT MODULE
102 WORD RECOGNITION MODULE
103 RECOGNITION DICTIONARY STORAGE MODULE
104 WORD DICTIONARY STORAGE MODULE
105 RECOGNITION RESULT VERIFICATION MODULE
106 RECOGNITION RESULT OUTPUT MODULE
107 CONTROL MODULE
110 CONTROL UNIT
111 I/F UNIT
112 OPERATION UNIT
113 PROGRAM STORAGE UNIT
114 DATA STORAGE UNIT
120 RAM
130 ROM
140 COMMUNICATION UNIT
150 HDD
151 IMAGE INPUT PROGRAM
152 WORD RECOGNITION PROGRAM
153 RECOGNITION RESULT VERIFICATION PROGRAM
154 RECOGNITION RESULT OUTPUT PROGRAM
155 RECOGNITION DICTIONARY
156 WORD DICTIONARY
200 DELIVERY ITEM SORTING APPARATUS
21 SUPPLY UNIT
22 TRANSPORT UNIT
23 SCANNER UNIT
24 ADDRESS RECOGNITION UNIT
25 SORTING UNIT
26 CONTROL UNIT
C MATCHED PORTION NUMBER
C1 MATCHED CHARACTER STRING
C2 MATCHED CHARACTER STRING
F MATCH FLAG
K LOOP COUNTER
L1 CHARACTER STRING LENGTH
L2 CHARACTER STRING LENGTH
R1 RECOGNITION RESULT
R2 RECOGNITION RESULT
S1 EVALUATION VALUE SET
S2 EVALUATION VALUE SET
S1avg EVALUATION AVERAGE VALUE
S2avg EVALUATION AVERAGE VALUE
S1$d$ RE-EVALUATION AVERAGE VALUE
S2$d$ RE-EVALUATION AVERAGE VALUE

The invention claimed is:

1. A word recognition apparatus comprising:
a memory; and
a control unit comprising one or more processors configured to:
receive input of a word image representing a plurality of characters;
recognize the word image and select a first word candidate and a second word candidate based on a plurality of words in a word dictionary;
identify unmatched characters between the first word candidate and the second word candidate;
compare a first image with a second image, the first image corresponding to a portion of the word image and the second image corresponding to the unmatched characters; and
determine a likelihood of the first word candidate based on the comparison between the first image and the second image.

2. The word recognition apparatus according to claim 1, wherein the one or more processors are further configured to determine the unmatched characters by comparing the first word candidate and the second word candidate character by character based on an edit distance indicating the number of operations for editing characters upon conversion from the first word candidate to the second word candidate.

3. The word recognition apparatus according to claim 1, wherein the one or more processors are further configured to: calculate, for each of the plurality of words, an evaluation value for each character when the word image is recognized as a plurality of characters, and select the first word candidate and the second word candidate from among the plurality of words using the calculated evaluation value.

4. The word recognition apparatus according to claim 1, wherein the one or more processors are further configured to: compare the first word candidate and the second word candidate character by character, detect as a matched character string a partially matched character string, and identify the unmatched characters between the first word candidate and the second word candidate by using the detected matched character string.

5. The word recognition apparatus according to claim 4, wherein the one or more processors are further configured to: extract a first unmatched character string, which is a character string obtained by excluding the matched character string from the first word candidate, extract a second unmatched character string which is a character string obtained by excluding the matched character string from the second word candidate, and verify a likelihood of the first word candidate based on a comparison of the word image to the first unmatched character string and a comparison of the word image to the second unmatched character string.

6. The word recognition apparatus according to claim 5, wherein the one or more processors are further configured to reject the first and second word candidates and determine that there is no recognition result based on the comparison of the word image to the first unmatched character string and the comparison of the word image to the second unmatched character string.

7. A delivery item sorting apparatus comprising:
a supply unit that supplies delivery items one by one;
a transport unit that transports the delivery items;
a scanner unit that captures an image of each of the delivery items and converts the image into image data;
an address recognition unit ha recognizes a destination address of the delivery item from the image data;
a sorting unit that sorts the delivery items into sorting boxes assigned to each destination address recognized by the address recognition unit; and
a control unit that controls operations of the supply unit, the transport unit, the scanner unit, the address recognition unit, and the sorting unit,
wherein the address recognition unit comprises a word recognition apparatus according to claim 1.

8. The word recognition apparatus according to claim 1, wherein the one or more processors are further configured to generate an evaluation value for the first word candidate by collating the portion of the word image with an image of the first word candidate, and generate an evaluation value for the second word candidate based on the collation of the portion of the word image with an image of the second word candidate.

9. A word recognition method comprising:
receiving input of a word image representing a plurality of characters;
recognizing the word image and selecting a first word candidate and a second word candidate based on a plurality of words registered in a word dictionary;
identifying unmatched characters between the first word candidate and the second word candidate;
comparing a first image with a second image, the first image corresponding to a portion of the word image and the second image corresponding to the unmatched characters; and
determining, using at least one processor associated with a control unit of a word recognition apparatus, a likelihood of the first word candidate based on the comparison between the first image and the second image.

10. The word recognition method according to claim 9, further comprising determining the unmatched characters by comparing the first word candidate and the second word candidate character by character based on an edit distance indicating the number of operations for editing characters upon conversion from the first word candidate to the second word candidate.

11. The word recognition method according to claim 9, further comprising calculating, for each of the plurality of words, an evaluation value for each character when the word image is recognized as a plurality of characters, and selecting the first word candidate and the second word candidate from among the plurality of words by using the calculated evaluation value.

12. The word recognition method according to claim 9, further comprising comparing the first word candidate and the second word candidate character by character, detecting as a matched character string a partially matched character string, and determining the unmatched characters between the first word candidate and the second word candidate by using the detected matched character string.

13. The word recognition method according to claim 12, further comprising extracting a first unmatched character string, which is a character string obtained by excluding the matched character string from the first word candidate, extracting a second unmatched character string which, is a character string obtained by excluding the matched character string from the second word candidate, and verifying a likelihood of the first word candidate based on a comparison of the word image to the first unmatched character string and a comparison of the word image to the second unmatched character string.

14. The word recognition method according to claim 13, further comprising rejecting the first and second word candidates and determining that there is no recognition result based on the comparison of the word image to the first unmatched character string and the comparison of the word image to the second unmatched character string.

15. A non-transitory computer readable medium storing a word recognition program that, when executed by a processor, causes a computer to perform the following word recognition method:
receiving input of a word image representing a plurality of characters;
recognizing the word image and selecting a first word candidate and a second word candidate based on a plurality of words registered in a word dictionary; and
identifying unmatched characters between the first word candidate and the second word candidate;
compare a first it with a second image, the first image corresponding to a portion of the word image and the second image corresponding to the unmatched characters; and
determining a likelihood of the first word candidate based on a the comparison between the first image and the second image.

16. The non-transitory computer readable medium according to claim 15, wherein the program, when executed by the processor, further causes the computer to perform the following step of the word recognition method:

determining the unmatched characters by comparing the first word candidate and the second word candidate character by character based on an edit distance indicating the number of operations for editing characters upon conversion from the first word candidate to the second word candidate.

17. The non-transitory computer readable medium according to claim 15, wherein the program, when executed by the processor, further causes the computer to perform the following steps of the word recognition method: calculating, for each of the plurality of words, an evaluation value for each character when the word image is recognized as a plurality of characters, and selecting the first word candidate and the second word candidate from among the plurality of words by using the calculated evaluation value.

18. The non-transitory computer readable medium according to claim 15, wherein the program, when executed by the processor, further causes the computer to perform the following steps of the word recognition method: comparing the first word candidate and the second word candidate character by character, detecting as a matched character string a partially matched character string, and determining the unmatched characters between the first word candidate and the second word candidate by using the detected matched character string.

19. The non-transitory computer readable medium according to claim 18, wherein the program, when executed by the processor, further causes the computer to perform the following steps of the word recognition method: extracting a first unmatched character string, which is a character string obtained by excluding the matched character string from the first word candidate, extracting a second unmatched character string, which is a character string obtained by excluding the matched character string from the second word candidate, and verifying a likelihood of the first word candidate based on a comparison of the word image to the first unmatched character string and a comparison of the word image to the second unmatched character string.

20. A word recognition apparatus comprising:
input means for inputting a word image representing a plurality of characters;
word candidate selection means for recognizing the word image input by the input means and selecting a first word candidate and a second word candidate based on a plurality of words registered in a word dictionary; and
verification means for:
determining unmatched characters between the first word candidate and the second word candidate,
comparing a first image with a second image, the first image corresponding to a portion of the word image and the second image corresponding to the unmatched characters, and
determining a likelihood of the first word candidate based on the comparison between the first image and the second image.

* * * * *